Feb. 5, 1924.
W. S. SIMPSON
CASTER
Filed April 17, 1922
1,482,527
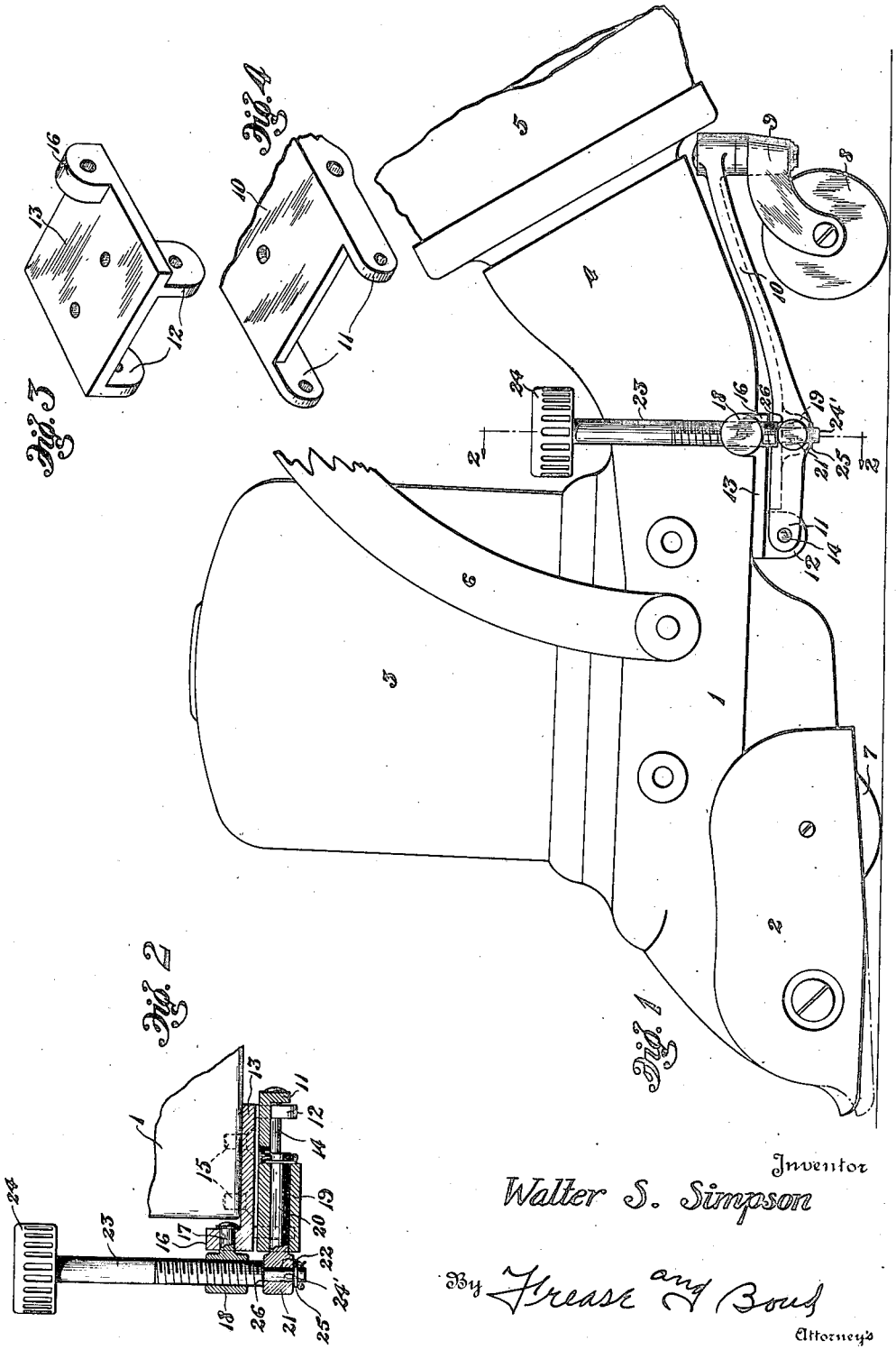
Inventor
Walter S. Simpson
By Frease and Bond
Attorneys Patented Feb. 5, 1924.

1,482,527

UNITED STATES PATENT OFFICE.

WALTER S. SIMPSON, OF CANTON, OHIO, ASSIGNOR TO THE UNITED ELECTRIC COMPANY, OF CANTON, OHIO, A CORPORATION OF OHIO.

CASTER.

Application filed April 17, 1922. Serial No. 553,863.

*To all whom it may concern:*

Be it known that I, WALTER S. SIMPSON, a citizen of the United States, residing at Canton, in the county of Stark and State of Ohio, have invented new and useful Improvements in Casters, of which the following is a specification.

This invention relates to casters for the rear end of portable vacuum cleaners or similar use wherein it is desirable to adjust the caster vertically with reference to the machine, to tilt the same upward or downward upon its forward wheels, and wherein the vibration of the machine tends to change the adjustment of the caster; and the objects of the improvement are to provide a simple means for adjusting such a caster to any desired position and for stopping or holding it in the various positions.

More generally, the invention involves means for adjusting two separable parts, one of which parts carries an adjusting screw swivelly connected to the other part, whereby the parts may be separated or brought toward each other and held in any given position of adjustment.

An application of the invention is illustrated in the accompanying drawings, forming part hereof, in which—

Figure 1 is a side elevation of a portable machine showing the improved caster thereon;

Fig. 2, a fragmentary section on line 2—2, Fig. 1;

Fig. 3, a perspective view of the bracket; and

Fig. 4, a fragmentary perspective view of a portion of the caster arm.

Similar numerals refer to similar parts throughout the drawing.

For the purpose of illustrating the application of the invention to a portable machine, a vacuum cleaner of any usual type is illustrated and comprises the fan casing 1, having the usual suction shoe or cleaning nozzle 2 at its forward end and supporting the motor casing 3, the discharge neck 4 being located at the rear end of the casing and communicating with the dust collecting bag 5, a handle bail 6 being pivotally connected to opposite sides of the casing for the purpose of manipulating the machine to and fro upon the floor.

Machines of this type are usually provided with a caster 7 on each side in rear of the ends of the cleaning nozzle, so that the same can be tilted forward or downward by lowering or raising the rear end of the machine; and for the purpose of limiting the downward movement, a rear caster 8 is usually employed.

By making this rear caster adjustable upward and downward with reference to the rear end of the machine, the normal position of the nozzle with reference to the floor or carpet can be varied at will.

For the purpose of the present invention, the rear caster is preferably mounted between the forks of the bracket 9 which is swivelly connected to the rear end of the caster arm 10, the forward end of said arm being provided with the ears 11 pivotally connected to the ears 12 of the bracket 13 by means of a pin 14.

The bracket 13 is fixed to the under side of the fan casing as by the screws 15 and is provided with the bearing 16 extending upward at one side of the casing, the spindle 17 of the internally threaded bearing 18 being journaled therein.

The caster arm 10 is provided on its under side with a tubular bearing portion 19 within which the spindle 20 is journaled, said spindle carrying at its outer end a head 21 having a transverse bore 22 therethrough.

The adjusting screw 23 is provided with a knurled head 24 conveniently located at the side of the rear of the machine, said screw being located through the threaded bearing 18 and having the reduced shank 24' swivelled within the bore of the head 21, a washer 25 being fixed upon the lower end of the shank and coacting with the shoulder 26 of the screw to prevent longitudinal movement of the screw within the head 21.

The parts are so arranged and proportioned that as the screw 23 is adjusted, the caster arm 10 will be moved toward or from the bottom of the vacuum cleaner, the spindles 17 and 20 adjusting themselves within their bearings to accommodate the adjusting screw in each position.

By this construction and arrangement, it is evident that the caster arm with the rear caster thereon may be adjusted to and from the bottom of the vacuum cleaner by merely turning the adjusting screw one way or another and that when a particular adjustment is given to the arm, the screw will normally hold the same in the adjusted position and the vacuum cleaner may be lifted from the floor either bodily or at its rear end without disturbing the adjustment of the caster arm.

The axis of the stem of the rear caster 8 is so located with reference to the arm 10 that when the forward lip of the nozzle is close to the floor, this axis of the rear caster stem is perpendicular to the floor in order to minimize the effect of dipping of the forward lip of the nozzle, due to the reversal of the rear caster as the machine is moved to and fro or turned upon the floor.

I claim:—

1. A caster for vacuum cleaners or the like including an arm pivoted thereto at one end and having a caster at the other end bearings on the cleaner and arm and an adjusting screw on one of the bearings and swivelled to the other bearing.

2. A caster for vacuum cleaners or the like including an arm pivoted thereto at one end and having a caster at the other end and an adjusting screw on the vacuum cleaner and swivelled to the arm.

3. A caster for vacuum cleaners or the like including an arm pivoted to the cleaner at one end and having a caster at the other end, a swivelled screw threaded bearing upon the vacuum cleaner and an adjusting screw carried by the bearing and swivelled to the arm.

4. A caster for vacuum cleaners or the like including an arm pivoted to the cleaner at one end and having a caster at the other end, a screw threaded bearing swivelled on the vacuum cleaner, a bearing swivelled on the arm and an adjusting screw carried by the threaded bearing and swivelled to the arm bearing.

5. In combination, a bracket having ears, an arm having ears at one end pivoted to the ears upon the bracket and having a caster at its other end, a screw threaded bearing swivelled upon the bracket, a bearing swivelled upon the arm and an adjusting screw carried by the threaded bearing and having a reduced shank swivelled to the arm bearing.

6. In combination a bracket, an arm pivoted at one end upon the bracket and having a caster at its other end, bearings swivelled on the arm and bracket and an adjusting screw in one bearing swivelled to the other bearing.

WALTER S. SIMPSON.